United States Patent
Kral et al.

(10) Patent No.: US 10,756,536 B2
(45) Date of Patent: Aug. 25, 2020

(54) SYSTEM FOR HANDLING SHORT CIRCUITS ON AN ELECTRICAL NETWORK

(71) Applicant: Aggreko Deutschland GmbH, Dorsten (DE)

(72) Inventors: Thomas Kral, Berlin (DE); Christian Hans, Berlin (DE); Peter Merk, Berlin (DE)

(73) Assignee: Aggreko Deutschland GMBH, Dorsten (DE)

( * ) Notice: Subject to any disclaimer, the term of this patent is extended or adjusted under 35 U.S.C. 154(b) by 509 days.

(21) Appl. No.: 15/496,251

(22) Filed: Apr. 25, 2017

(65) Prior Publication Data
US 2017/0229857 A1   Aug. 10, 2017

Related U.S. Application Data

(63) Continuation of application No. PCT/EP2014/073234, filed on Oct. 29, 2014.

(51) Int. Cl.
| | |
|---|---|
| *H02H 7/28* | (2006.01) |
| *H02J 3/38* | (2006.01) |
| *H02J 3/18* | (2006.01) |
| *H02M 7/537* | (2006.01) |
| *H02M 1/32* | (2007.01) |

(52) U.S. Cl.
CPC .............. *H02H 7/28* (2013.01); *H02J 3/18* (2013.01); *H02J 3/382* (2013.01); *H02J 3/383* (2013.01); *H02J 3/386* (2013.01); *H02M 7/537* (2013.01); *H02M 2001/325* (2013.01)

(58) Field of Classification Search
CPC .... H02J 3/18; H02J 3/382; H02J 3/383; H02J 3/386; H02M 7/537; H02M 2001/325; H02H 7/28
USPC .......................................................... 361/62
See application file for complete search history.

(56) References Cited

FOREIGN PATENT DOCUMENTS

| JP | 2012513187 A | 6/2012 |
|---|---|---|
| JP | 2014168351 A | 9/2014 |

OTHER PUBLICATIONS

Peng F.Z. et al: Control and Protection of Power Electronics Interfaced Distributed Generation Systems in a Customer-Driven Microgrid, Power & Energy Society General Meeting, 2009; PES '09, IEEE, IEEE, Piscataway, NJ, Jul. 26, 2009; s. 1-8 (Year: 2009).*

(Continued)

*Primary Examiner* — Kevin J Comber
(74) *Attorney, Agent, or Firm* — Osha Liang LLP

(57) ABSTRACT

A system for handling short circuits on an electrical network comprising parallel operated units which are droop controlled for active and reactive power sharing and connected to each other via impedances and protection switches for detecting and handling a short circuit on the electrical network and for disconnecting the faulty part of the electrical network, said units including a DC-source and a grid forming voltage source inverter controlled by a cascaded control structure with an inner voltage control loop and a short circuit control for limiting the output current by changing the output voltage at the output terminals of the inverter as a function of the measured output current and a desired droop voltage provided by a droop controller for voltage and frequency power sharing.

19 Claims, 11 Drawing Sheets

(56) References Cited

OTHER PUBLICATIONS

De Brabandere K. et al., A Voltage and Frequency Droop Control Method for Parallel Inverters; IEEE Transactions on Power Electronics, Institute of Electrical and Electronics Engineers, vol. 22, No. 4, Jul. 1, 2007 (Year: 2007).*

Japanese Office Action for Application No. 2017-519480 dispatch dated Oct. 16, 2018, 3 pages.

Peng F.Z. et al: Control and Protection of Power Electronics Interfaced Distributed Generation Systems in a Customer-Driven Microgrid, Power & Energy Society General Meeting, 2009; PES '09, IEEE, IEEE, Piscataway, NJ, Jul. 26, 2009; pp. 1-8.

De Brabandere K. et al., A Voltage and Frequency Droop Control Method for Parallel Inverters; IEEE Transactions on Power Electronics, Institute of Electrical and Electronics Engineers, vol. 22, No, 4, Jul. 1, 2007.

International Search Report dated Aug. 6, 2015 re App. No. PCT/EP2014/073234.

F. Salha, F. et al: Virtual Resistance Principle for the Overcurrent Protection of PWM Voltage Source Inverter, Innovative Smart Grid Technologies (ISGT) Conference Europe, 2010 IEEE PES, IEEE, 2010, pp. 1-6.

Hauck, M.: Bildung Eines Dreiphasigen Inselnetzes Durch Unabhangige Weschselrichter Im Parallelbetrieb; PhD Thesis, Universitate Fridericiana Karlsruhe, 2002.

Rocabert, Joan, et al.: Control of Power Converters in AC Microgrids, IEEE Transactions on Power Electronics, vol. 27, No. 11, Nov. 2012, pp. 4734-4749.

Guerrero, J., et al.: Decentralized Control for Parallel Operation of Distributed Generation Inverters Using Resistive Output Impedance; IEEE Transactions on Industrial Electronics, vol. 54, No. 2, Apr. 2007.

Pecas Lopes et al.: Defining Control Strategies for MicroGrids Islanded Operation, IEEE Transactions on Power Systems, vol. 21, No. 2, May 2006, pp. 916-924.

* cited by examiner

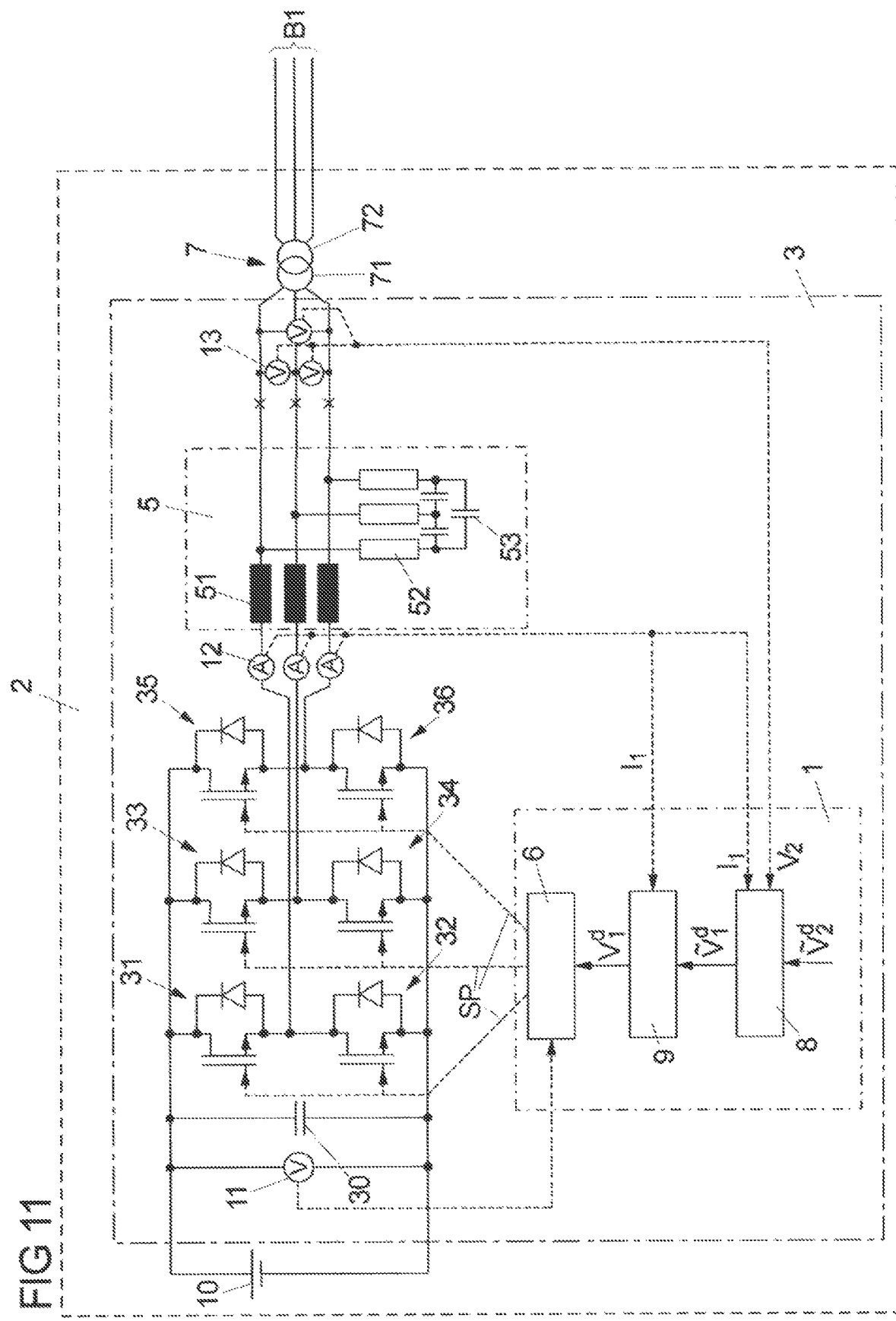

SYSTEM FOR HANDLING SHORT CIRCUITS ON AN ELECTRICAL NETWORK

CROSS-REFERENCE TO RELATED PATENT APPLICATIONS

This application is a Continuation of International Patent Application No. PCT/EP2014/073234, filed Oct. 29, 2014, the entire disclosure of which is hereby incorporated by reference herein.

BACKGROUND

The present application relates to a system for handling short circuits on an electrical network comprising parallel operated units which are droop controlled for active and reactive power sharing and connected to each other via impedances and protection switches for detecting a short circuit on the electrical network and for disconnecting the faulty part of the electrical network.

In electrical networks or grids with a high share of renewable energy sources, classical generators can be replaced by inverters that connect storage devices with the electrical network. In general, inverters can be controlled in a grid feeding or grid forming way. Almost all inverters connecting renewable energy sources with the grid are controlled as grid feeding units. This means that they need a voltage and frequency to synchronize. They cannot run without an existing grid that provides these quantities. The control of grid feeding inverters is designed to inject or consume a certain amount of reactive and active power if active power is available.

In contrast, grid forming inverters provide frequency and voltage. They can build the grid if no AC voltage is available or synchronize to an existing voltage and run in parallel with the grid. If changes in load or generation occur, they share these variations in power in a decentralized way. In a more abstract way, the grid feeding devices can be modelled by a current source that can only feed into an electrical network if a voltage and frequency exists on the network. The grid forming inverters, however, can be modelled by voltage sources providing voltage and frequency.

The grid forming inverters run in parallel in a decentralized manner, synchronized by droop controllers for active and reactive power sharing as known from the document "A. Engler and N. Soultanis, "Droop control in Iv-grids," in International Conference on Future Power Systems, 2005". Among other things, this control allows sharing active and reactive power between the units, whereby droop controlled inverters can also run in parallel with conventional units, such as diesel generators or gas turbines as they are almost all controlled in a droop kind of way as well. The synchronization between all the units is still decentralized, i.e. without explicit communication, but only through frequency and voltage. Through this synchronization, the voltage sources need no explicit communication network, allowing a geographical distribution of the units.

FIG. 1 shows a schematic block diagram of an electric distribution network or grid comprising a plurality of droop controlled inverters $2.1$-$2.N$ including impedances such as transformers or lines, conventional generators $4.1$-$4.N$ including impedances such as transformers or lines, renewable energy sources such as wind power units $WP_1$-$WP_N$ and photovoltaic (solar) power units $PV_1$-$PV_N$ including impedances such as transformers or lines, and loads $L_1$-$L_N$ including impedances such as transformers or lines distributed among the grid the grid in a decentralized way and connected to different bus bars $B_1$-$B_N$ which are interconnected by transmission lines $TL_1$-$TL_N$. In the following it is assumed that a short circuit could occur on any of the transmission lines $TL_1$-$TL_N$ including their ends, i.e. bus bars $B_1$-$B_N$.

FIG. 2 depicts a schematic block diagram of the part II according to FIG. 1 showing an electrical network or grid comprising conventional generator units $4.1$-$4.N$ and a plurality of inverter units $2.1$ to $2.N$ coupled to a common coupling point such as a bus bar $B_1$ and via a three phase electrical transmission $TL_1$ to a load $L_1$ and a renewable energy source such as a wind power unit $WP_1$. The conventional generator units $4.1$-$4.N$ include conventional, e.g. synchronous or asynchronous generators $40.1$-$40.N$ and are coupled through impedances, denoted by transformers $41.1$ to $41.N$ to the bus $B_1$, but could also be coupled through normal impedances or multiple wound transformers such as triple wound transformers having two windings on the low voltage and one winding on the high voltage side, or connecting two conventional generators with a medium voltage grid through one transformer. The inverter units $2.1$ to $2.N$ comprise DC-storage units $10.1$ to $10.N$ such as e.g. batteries, flywheels, fuel cells or a DC bus, generated by DC/DC converters, grid forming inverters $3.1$ to $3.N$, running in parallel, transformers $7.1$ to $7.N$ the primary windings of which are connected to the output of the voltage source inverters $3.1$ to $3.N$ and the secondary windings of which are connected to the point of common coupling B1 and via protection switches to the electrical transmission lines $TL_1$ of the electrical network. Furthermore the electrical network comprises one or more protection switches $14$, $15$ in the electrical transmission line $TL_1$ for detecting a fault and disconnecting the faulty part of the grid.

In the exemplary electrical network, shown in FIG. 2 the grid forming inverters $3.1$ to $3.N$ that connect the storage units $10.1$ to $10.N$ with the common bus bar $B_1$ of the electrical network are coupled through impedances, represented by the transformers $7.1$ to $7.N$, but could also be coupled through e.g. electrical transmission lines $TL_1$-$TL_N$, impedances or a combination of them.

The load L1 could also be negative in case of a renewable energy WP1 source or a node that contains both, renewable energy generation and load, e.g. WP1 and L1 could be modelled as one load connected to bus bar B2.

In case of a short circuit (SC) on the electrical transmission line $TL_1$, the protection switches $14$, $15$ detect a fault and disconnect the faulty part of the grid. In most of these cases this detection is done by means of overcurrents that occur during short circuits. Normally, these overcurrents are mostly provided by conventional, e.g. synchronous or asynchronous generators. In order to replace them with grid forming voltage source inverters, it has to be assured that those voltage source inverters are able to provide the short circuit currents that were formerly supplied by the synchronous or asynchronous generators.

Providing these short circuit currents with inverters can be divided into three subtasks, namely into a limitation of short circuit currents, power sharing during short circuit and a provision of short circuit currents for different faults.

The first subtask, "limitation of short circuit currents during short circuit" is necessary to protect the electronic components of the inverters from damage. Hence, their output current has to be limited to a certain value, such that the maximum current of each unit is not exceeded even in case the short circuit occurs directly after the transformer such that the short circuit impedance has the smallest value that will occur. Simply switching the inverter units off is not an option, as the short circuit currents have to be served for a certain period of time in the range of seconds to trip the protection switches of the electrical transmission lines.

The second subtask, "synchronization and power sharing during short circuit", is necessary because in AC grids the units must stay synchronized in order to achieve power sharing. In normal operation, this could be done by using droop controllers for voltage and frequency as mentioned above. With this power sharing mechanism, the balance between generation and consumption is achieved by inverters that change their power (and share the power variations that occur) in order to maintain a power equilibrium in the electrical network.

The droop concept is intended to ensure load/power sharing in normal parallel operation but it is desirable to maintain this property during short circuit, such that the installation of multiple inverters that run in parallel results in a multiple short circuit current. This is important, because tripping the protection switch requires a certain amount of current that has to be delivered by the inverters. Hence, the (mostly reactive) power must be shared among the inverters, if possible. For power sharing during short circuit, the voltage after the transformer must be non-zero, to allow an implicit communication between the inverters through voltage and frequency. If the voltage after the transformer is zero no communication and, hence no synchronization is possible.

The third subtask, "provision of short circuit currents for different faults", is necessary because in electrical power networks, different types of short circuits occur. In particular the following five types of faults can be divided into symmetrical and unsymmetrical faults. Symmetrical short circuits occur as a) three phase and b) three phase to ground faults, whereas unsymmetrical short circuits occur as a) two phase, b) two phase to ground and c) single phase to ground faults. For all types of faults, the short circuit current must be provided without an excessive peaking of one or more phases above the allowed voltage or current value before, during and after the short circuit.

There are two types of prior art solutions that can be distinguished by the control mode of the inverter during short circuit. The first type of short circuit handling limits the currents by directly controlling them, i.e. direct control of the output or filter currents of the inverter. This control mode is normally used for grid feeding inverters, that only run if a grid with given voltage and frequency exists.

The second type limits the current by reducing the voltage as function of the currents, i.e. indirectly controlling the currents by reducing the voltage as function of the current. This control mode is normally used for grid forming inverters that can provide voltage and frequency to the grid.

Even though, the two short circuit control solutions are often closely connected to the normal operation mode (grid forming or following), the control modes in normal operation and short circuit can differ whereby a grid forming inverter could, for example, change its control mode in a short circuit case from grid forming to grid feeding mode.

For parallel running grid forming inverters the following three solutions have been proposed to cope with short circuits.

From the document "M. Hauck: Bildung eines dreiphasigen Inselnetzes durch unabhängige Wechselrichter im Parallelbetrieb (PhD thesis, Universität Fridericiana Karlsruhe, 2002)" a nonlinear, piecewise affine approach that reduces the voltage of each phase as function of the current of the corresponding phase is known. As the voltage is only reduced if the current exceeds a certain value, the resulting curves have a high total harmonic distortion for all kinds of short circuits. Also, due to the nonlinear limitation for each phase, the instantaneous power would have a pulsating waveform, even for symmetric short circuits, making it harder to synchronize for the grid forming units during a short circuit.

The prior art document "K. De Brabandere, B. Bolsens, J. Van den Keybus, A. Woyte, J. Driesen, and R. Belmans: A voltage and frequency droop control method for parallel inverters (IEEE Transactions on Power Electronics, vol. 22, no. 4, pp. 1107-1115, 2007)" discloses a virtual complex impedance to limit short circuit currents. In comparison to the solution mentioned before this does not lead to a high total harmonic distortion but carries the need for a voltage controller that compensates the voltage drop during normal operation and so extends the complexity of the system. To prohibit the integrator from increasing the voltage during short circuit it also has to be limited. This results in an unnecessary intricacy that may lead to problems in the design of the controller and the virtual impedances.

The prior art document "F. Salha, F. Colas, and X. Guillaud: Virtual resistance principle for the overcurrent protection of pwm voltage source inverter (Innovative Smart Grid Technologies (ISGT) Conference Europe, 2010 IEEE PES, IEEE, 2010)" discloses also a virtual complex current dependent impedance to limit the SC currents. In comparison to the prior approach, the impedance is current dependent in a sense that its voltage drop depends on the difference between a nominal and the measured current.

All known solutions have in common that they use a virtual impedance to guarantee parallel operation during a short circuit. With an inverter running as a voltage controlled current source this would not be possible.

Existing solutions for grid feeding inverters all lack the fact that they need a voltage to keep synchronized during a short circuit. Also, inverters controlled as current sources at the moment only provide positive sequence current that may lead to overvoltages and a decreased amount of short circuit power to trip protection switches as would actually be possible by the inverter ratings. Synchronization and reactive power sharing can only be guaranteed if voltage and frequency on the terminals of the inverters exists.

The above mentioned solutions for grid forming inverters, controlled as voltage sources offer the following drawbacks of: a high total harmonic distortion; a DC voltage offset for certain operating conditions; non-constant power due to the nonlinearity of the limitation, for all types of short circuits, which has a negative effect on the synchronization and power sharing of the units, and results in the need of an additional controller to compensate the voltage drop over the virtual impedance; and an increased complexity which makes it hard to design the system properly.

SUMMARY

It is an object of the present application to provide a system for handling short circuits on an electrical network comprising parallel operated inverter units which are droop controlled for active and reactive power sharing which limits the current of the inverter unit to protect electrical elements of the inverter unit, prevents any overvoltage during and after short-current, provides a current of the related phases of the grid which is as big as possible to trip protection devices, assures a parallel operation by limiting the drift of phase angle difference and voltage amplitudes to keep parallel operating inverter units synchronized during short circuit, and copes with unsymmetrical short circuits while maintaining the power sharing of the parallel operating inverter units.

Accordingly, the present application provides a system for handling short circuits on an electrical network comprising parallel operated units which are droop controlled for voltage and frequency power sharing and connected to each other via impedances and protection switches for detecting a short circuit on the electrical AC network and for disconnecting the faulty part of the electrical network, said units including a direct current source (DC-source) and a grid forming AC voltage source inverter controlled by a cascaded control structure with an inner voltage control loop and a short circuit control for limiting the output current and the mean output voltage at the output terminals of the inverter as a function of the measured output current and a desired voltage provided by a droop control for voltage and frequency power sharing.

This control approach is equally valid for the operation of a single stand-alone inverter driving the grid, of course.

The present application handles short circuits on an electrical network comprising parallel operated and droop controlled units with grid forming voltage source inverters by limiting the current of the inverters to protect electrical components of the inverter, preventing any overvoltage and -current during and after short-circuit on the inverter side, providing a current of the related phases of the grid which is as big as possible to trip protection devices, assuring a parallel operation without extensive drift of phase angle difference and voltage amplitudes to keep parallel operating units synchronized during short circuit and coping with unsymmetrical short circuits while maintaining the power sharing of the parallel operating units whereby the grid forming voltage source inverters may run in parallel with conventional generator units In a first embodiment of the application the voltage amplitude $|V_2^d|$ of a desired reference voltage $V_2^d$ provided to the inner voltage control loop is reduced as a function of the desired voltage $\tilde{V}_2^d$ of the droop control and an output current amplitude $|I_2|$, of a second measured output current $I_2$ such that the desired reference voltage $V_2^d$ is given by the offset $|\tilde{V}_2^d|$ of the desired droop voltage $\tilde{V}_2^d$ and a function $f_1(|I_2|)$ of the second measured output current $I_2$ according to $$V_2^d(\tilde{V}_2^d, I_2) = (|\tilde{V}_2^d| - f_1(|I_2|))\sin(\Phi_{\tilde{V}_2^d})$$

$$(|\tilde{V}_2^d| - f_1(|I_2|)) = |V_2^d|$$

Where the current dependent function $f_1(|I_2|)$ is zero if the amplitude of the second measured output current $|I_2|$ is lower than a given current limit $|I_2^N|$ and greater than zero if the amplitude of the second measured output current $|I_2|$ raises above the given current limit $|I_2^N|$. In particular the current dependent function $f_1(|I_2|)$ raises fast when the amplitude of the second measured output current $|I_2|$ raises above the given current limit $|I_2^N|$ and decreases slowly, due to a slew- or ramp-rate of falling values of the second measured output current amplitude $I_2$.

In a second embodiment of the application the second measured output current $I_2$ is limited by a virtual frequency independent impedance $Z_v(|I_2|)$ placed between a low-pass filter of the grid forming voltage source inverter and the output terminals of the inverter such that the desired reference voltage $V_2^d$ of the short circuit handling inverter depends on the desired droop voltage $\tilde{V}_2^d$ and the amplitude of the second measured output current $|I_2^N|$ and the instantaneous value $I_2$ according to $$V_2^d = \tilde{V}_2^d + Z_v(|I_2|)I_2$$

The virtual frequency independent impedance $Z_v(|I_2|)$ can be selected as either a piecewise constant impedance or current dependent impedance to limit short circuit currents.

For example, the virtual frequency independent and piecewise constant impedance $Z_v(|I_2|)$ to limit short circuit currents is zero as long as the second measured output current $I_2$ is below a given threshold value $|I_2^N|$, in particular a nominal second output current $I_2^N$, and is switched to a constant value if the second measured output current $I_2$ exceeds the given threshold value $|I_2^N|$ according to the following equation:

$$Z_v(|I_2|) = \begin{cases} Z_K & \text{if } |I_2| \geq I_2^N \\ 0 & \text{else} \end{cases}$$

whereby after clearing the short circuit, the virtual impedance $Z_v(|I_2|)$ either decreases with a slew- or ramp-rate such that the second output voltage $V_2$ on the terminals of the inverter increases as the virtual impedance $Z_v(|I_2|)$ becomes smaller or is set to zero instantaneously. Alternatively, a function is activated ensuring that the value of the virtual impedance $Z_v(|I_2|)$ is changed only if the second measured output current $I_2$ is below a certain threshold for a predefined period.

In a third embodiment, a virtual frequency independent and current dependent impedance $Z_v(|I_2|)$ for limiting short circuit currents is based on a piecewise affine or polynomial function which changes with the amplitude of the second measured output current $I_2$ according to $$Z_v(|I_2|) = \begin{cases} \frac{V^N}{I_2^K - I_2^N}(|I_2| - I_2^N) & \text{if } |I_2| \geq I_2^N \\ 0 & \text{else} \end{cases}$$

wherein $V^N$ is a nominal output voltage of the inverter, $I_2^N$ is a threshold, e.g. the nominal output current of the inverter, $|I_2|$ is the amplitude of the second measured output current $I_2$ of the inverter and $I_2^K$ is a threshold value of the second measured output current $I_2$ of the inverter.

Preferably the change of the value of the virtual frequency independent and current dependent impedance $Z_v(|I_2|)$ is limited to obtain a more sinusoidal waveform during unsymmetrical short circuits.

Alternatively the virtual frequency independent and current dependent constant impedance $Z_v(|I_2|)$ follows a polynomial, exponential or sinusoidal function. Further, the above mentioned embodiments can use the converter-facing current $I_1$ instead of the grid-facing current $I_2$ as input of the virtual impedance $Z_v$.

The different functions for handling short circuit currents as described before can be introduced into a cascaded control structure wherein: the unit with grid forming inverters comprise controllable power electronic devices having an input terminal, an output terminal and a control terminal, a low pass filter connected to the output terminals of the power electronic devices and a discrete time controller; the control terminals of the power electronic devices receive switching pulses from an output of the time controller the input terminals of which are exposed to a measured input voltage of the DC-source; an output voltage of the grid forming inverter; a measured output current of the power electronic devices or a measured output current of the grid forming inverter; a desired droop control voltage from a next control cascade; and the time controller comprises a pulse width modulator providing the switching pulses to the control terminals of the power electronic devices, a voltage controller for controlling the output voltage of the inverter and a short circuit controller for limiting the output voltage of the inverter.

Different embodiments of cascaded control structures are disclosed herein.

BRIEF DESCRIPTION OF THE DRAWINGS

Further features and advantages of the present application will become apparent from the following detailed description, taken in combination with the appended drawings, in which:

FIG. 10 is a schematic circuit and block diagram of a third embodiment of a control structure of a grid forming unit wherein the input voltage of an inverter is controlled as a function of the output current and output voltage of the inverter and a desired droop control voltage and FIG. 11 is a schematic circuit and block diagram of a fourth embodiment of a control structure of a grid forming unit wherein the input voltage of an inverter is controlled as a function of the current on the lines between the output terminals of the power electronic devices and the low-pass filter of the inverter and a desired droop control voltage.

DETAILED DESCRIPTION

The various embodiments will be described in detail with reference to the accompanying drawings. Wherever possible, the same reference numbers will be used throughout the drawings to refer to the same or alike parts. References made to particular examples and implementations are for illustrative purposes, and are not intended to limit the scope of the application or the claims.

As used herein, the terms "about" or "approximately" for any numerical values or ranges indicates a suitable dimensional tolerance that allows the part or collection of components to function for its intended purpose as described herein. Furthermore, the number N of inverter units, generator units etc. may be equal or different, i.e. there may be M inverter units, N generator units, O bus bars, P photovoltaic power units etc.

Figure 1:
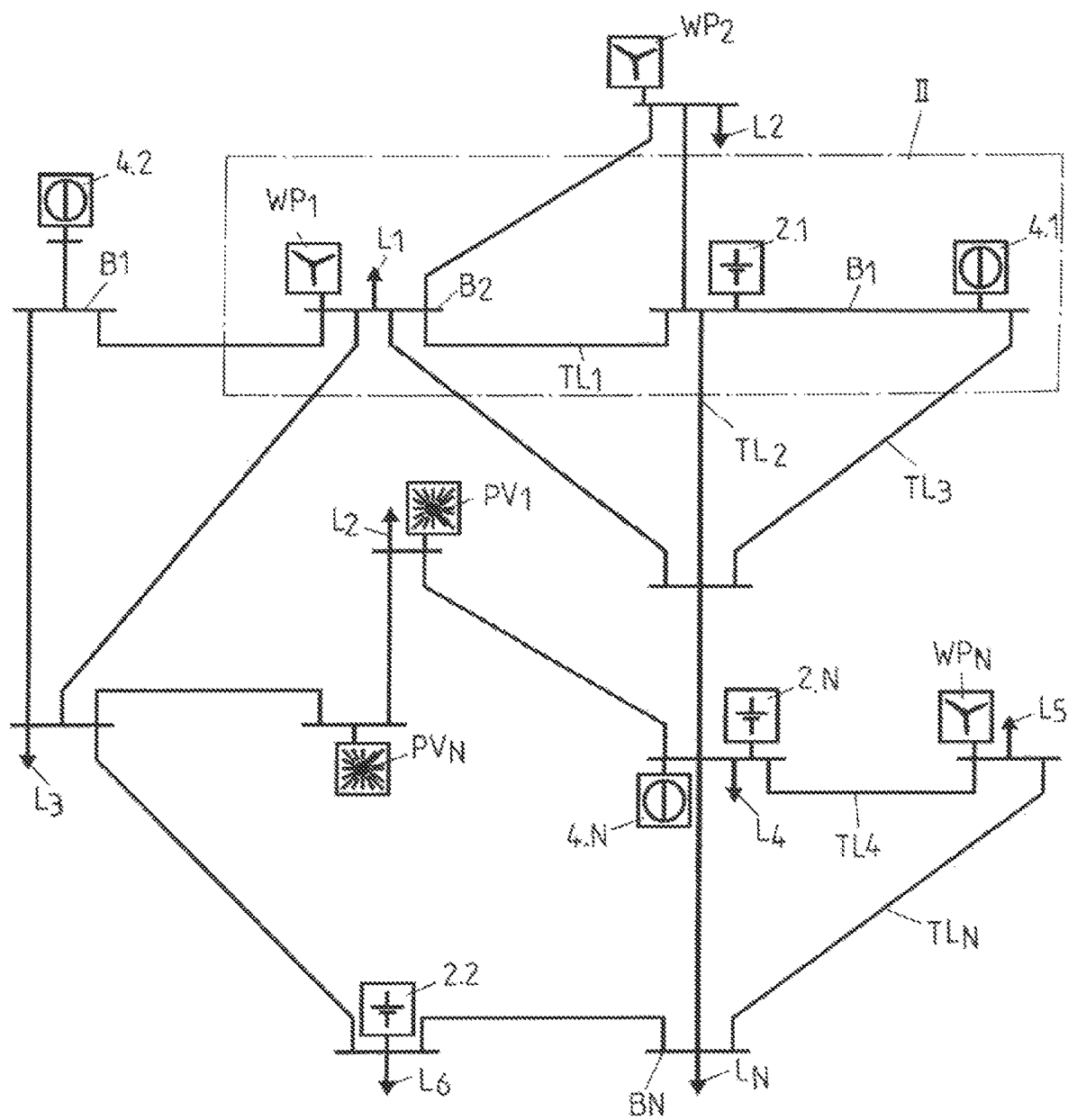
FIG. 1 is a schematic block diagram of an electric distribution network or grid comprising a plurality of droop controlled inverters, conventional generators, renewable energy sources and loads distributed among the grid in a decentralized way.
Figure 2:
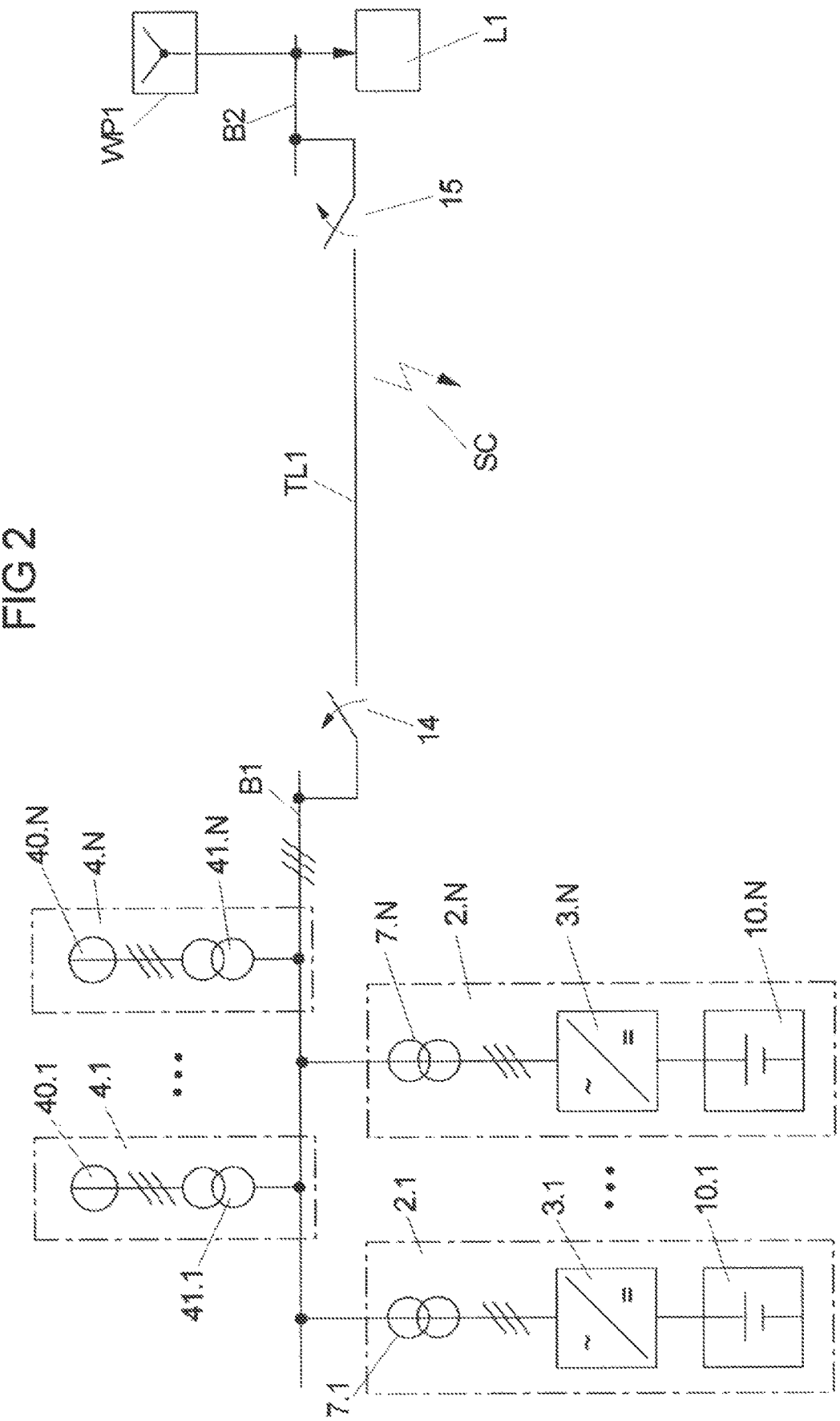
FIG. 2 is a schematic block diagram of a part of an electrical network comprising a plurality of units with voltage source inverters running in parallel while a short circuit occurs.
Figure 3:
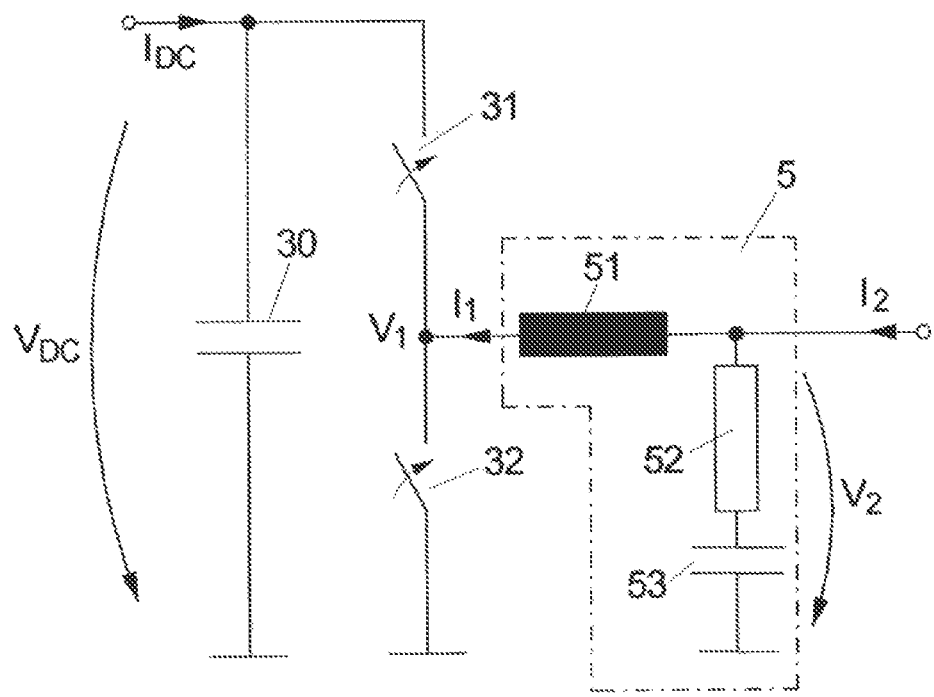
FIG. 3 is a schematic circuit diagram of a single-line representation of a switching inverter.
Figure 4:
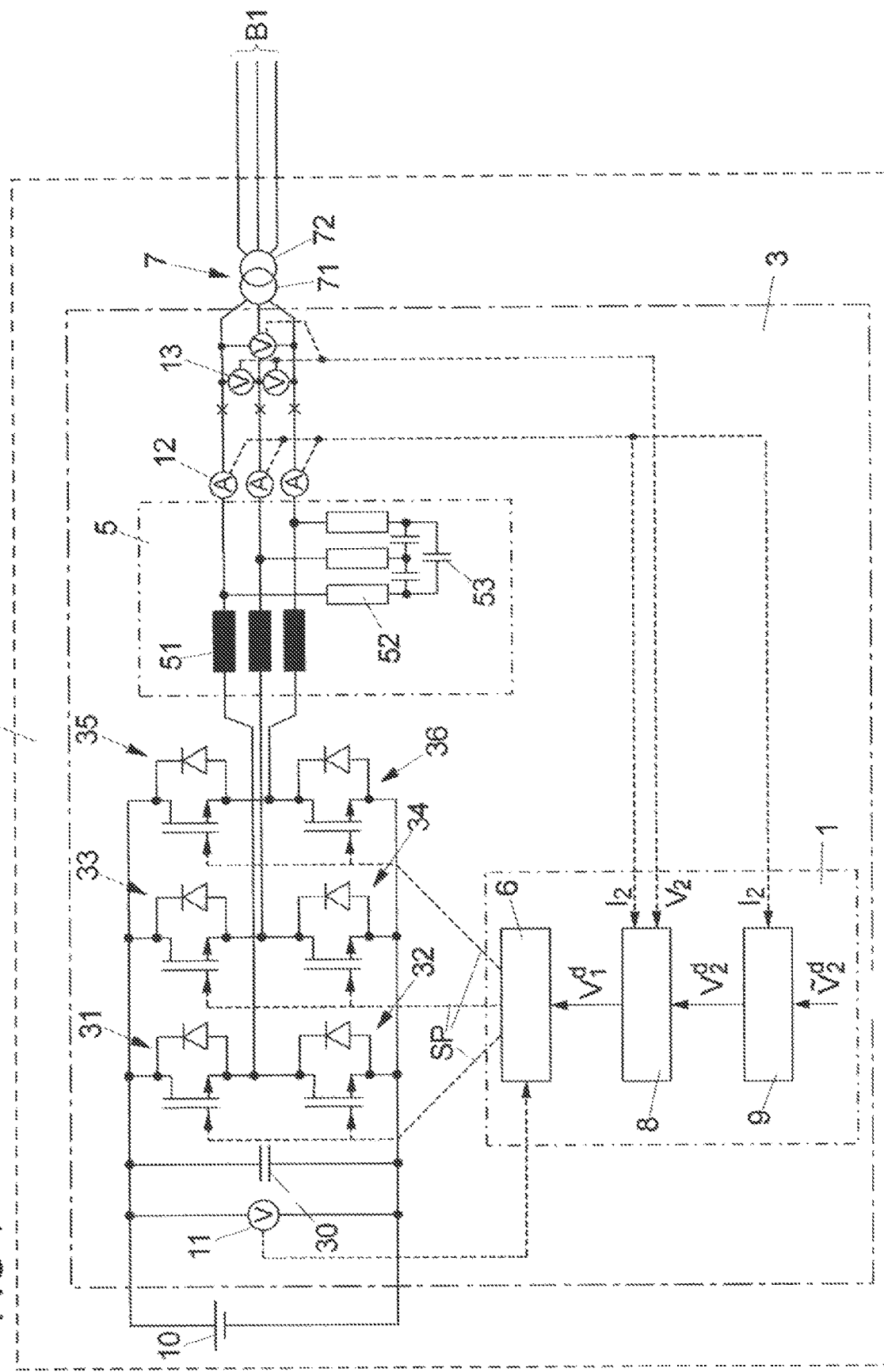
FIG. 4 is a schematic circuit and block diagram of a first embodiment of a control structure of a grid forming unit wherein the output voltage of an inverter is controlled as function of the output current of the inverter and a desired droop control voltage.

FIG. 3 illustrates a schematic circuit diagram of a single-line representation of a switching voltage source inverter 3 according to FIG. 4 which is applied in a unit with parallel running inverters 3.1-3.N according to the schematic block diagram of FIG. 2. The single-line representation of the switching voltage source inverter 3 shows two semiconductor switches 31, 32 of a power electronic device the input terminals of which are connected to a DC-source providing a DC input voltage $V_{DC}$ and DC input current $I_{DC}$ via an input capacitor 30. The output terminals of the semiconductor switches 31, 32 are commonly connected to a first (semiconductor terminal) of a filter inductance 51 of a low-pass filter 5 the second terminal of which is connected to a series connection of a filter resistor 52 and a filter capacitor 53 connected to ground.

A first output voltage $V_1$ and a first measured output current $I_1$ are delivered at the interconnection of the output terminals of the semiconductor switches 31, 32 of the power electronic device. A second output voltage $V_2$ is provided at the series connection of the filter resistors 52 and the filter capacitor 53 of the low-pass filter 5 and a second output current $I_2$ (in case of a short circuit the short circuit current) is provided on the line between the low-pass filter 5 and the transformer 7 at the output terminal of the inverter 3 according to FIG. 2.

As mentioned above there are three main tasks to be solved to safely provide short circuit currents, namely: the current of the inverters has to be limited during short circuit; the provided current has to be as high as possible to trip the protection devices; and the inverters have to stay synchronized in order to provide the desired current jointly.

As to the first and second technical requirement of a short circuit handling the limits for the semiconductor switches 31 and 32 of the switching, controlled voltage source inverter 3 must not be exceeded when a short circuit occurs, during the whole time of the short circuit and after the short circuit, in order to protect these components. These limits are the instantaneous values of current and voltage of every phase. For the single line representation of the switching voltage source inverter 3 according to FIG. 3 this means that the absolute values $V_1$, $V_2$, $I_1$ and $I_2$ stay below the maximum value in symmetrical and unsymmetrical fault conditions. The current of the corresponding phase(es) should be as big as possible in order to trip the protection devices as fast as possible.

As to the third technical requirement of an optimized short circuit handling the inverters 3 have to share the short circuit currents. Hence, the phase angles and amplitudes of the voltages on the AC terminals of the inverters 3 have to stay synchronized in order to achieve this power sharing property. The need for synchronization results from a smal l drift of the internal clocks of the inverters 3. This drift $\epsilon$ leads to an error in the integration of the phase angle $\delta(t)$ according to the following equation:

$$\delta(t) = \int_0^t \omega(\tau) + \epsilon d\tau = \int_0^t \omega(\tau) d\tau + \epsilon t$$

from the frequency $\omega(\tau)$. As the error is integrated with $\omega(\tau)$, the phase angles $\delta(t)$ of the inverters 3 would drift away from each other even if they had the same frequency and initial phase angle. Through the inductive coupling of the units connected to the electrical network this would lead to an undesired power flow between the units and in the short circuit case in a reduction of the current for tripping the protection devices. To cope with this lack of accuracy, droop control is used to keep the difference in phase angles constant in a decentralized fashion Droop control is commonly applied to generators or inverters for primary frequency and voltage control to allow parallel operation and load sharing. Since, in inductive grids, active power has a large influence on the phase angle and reactive power has a large influence on the voltage difference, the phase angle and voltage can be used to control active and reactive power. Furthermore, for classical generators, from the swing equation it is known that frequency is related to the phase angle, such that by controlling active power, frequency and hereby the phase angle is controlled. This forms the basis of frequency and voltage droop control where active and reactive power are adjusted according to linear characteristics.

Thus, the power sharing property of the units connected to the electrical network has be preserved during short circuit such that the provided currents of the units sum up. Also, it is important to keep the inverters synchronized during short circuit to prevent cross currents between the units that result from different phase angles and, hence limit the power delivery of the inverters.

In the following different cascaded control structures with short circuit handling will be explained in connection with FIGS. 4 and 9 to 11.

The inner loop of the cascaded control structure of a discrete time controller 1 according to FIG. 4 consists of a voltage controller 8 and an inverter unit 2 which comprises a DC-source 10, a (grid forming) inverter 3, a transformer 7 and a pulse width modulator 6. The inverter 3 includes controllable power electronic devices 31-36 and a low pass filter 5 comprising filter inductances 51, filter resistors 52 and filter capacitors 53. Alternatively, the capacitor could also be connected in star connection and not in triangle as in FIG. 4, and FIG. 9-11. The pulse width modulator 6 provides switching pulses SP to the control terminals of the power electronic devices 31-36 depending on a measured input voltage $V_{DC}$ of the DC-source 10 measured by a voltage sensor 11 and a desired mean value of the input voltage $V_1^d \in \mathbb{R}^3$ over one switching instant on the power electronic side of the low-pass filter 5.

This voltage $V_1^d \in \mathbb{R}^3$ is provided by the output terminal of the voltage controller 8 the input terminals of which receive a first input signal corresponding to the output voltage $V_2$ of the inverter 3 (i.e. the instantaneous voltage at the beginning of the discrete time control cycle), optionally a second input signal corresponding to a second measured output current $I_2 \in \mathbb{R}^3$ on the interconnection of the filter inductances 51 of the low pass filter 5 and the primary winding 71 of the transformer 7 measured by a current sensor 12. The secondary winding 72 of the transformer is connected to the point of common coupling in form of the bus bar B1 of the electrical network or grid which may also contain inverters and conventional generators with a similar control structure as the controlled inverter 3 of the unit 2 or other control as is the case for renewable energy sources.

A short circuit controller 9 is added to the inner loop for changing the reference voltage amplitude $V_2^d \in \mathbb{R}^3$ of the inverter terminals measured by a second voltage sensor 13. The short circuit controller 9 receives at its input terminals an input signal corresponding to a measured output current $I_2$ of the grid forming inverter 3 between the low-pass filter 5 and the primary winding 71 of the transformer 7, and a desired voltage $\tilde{V}_2^d$ from the next control cascade. At its output terminal the short circuit controller 9 provides a reference voltage $V_2^d$ to an input terminal of the voltage controller 8.

The pulse width modulator 6, voltage controller 8 and short circuit controller 9 together with the part that provides the reference signal $\tilde{V}_2^d$ form a discrete time controller 1 for handling normal operation as well as a short circuit on the electrical network or transmission line TL1, respectively.

In order to limit the output current $I_2 \in \mathbb{R}^3$, the output voltage $V_2$ on the terminals of the inverter 3 is reduced as a function of the measured current $I_2$ on the lines between the low-pass filter 5 of the inverter 3 and the transformer 7. Through the pulse width modulator 6 and the voltage controller 8 this voltage $V_2^d = f(\tilde{V}_2^d, I_2)$ is transformed to switching pulses SP for the power electronic devices 4.

The desired voltage $\tilde{V}_2^d$ is e.g. generated using droop control as described above to synchronize the inverters and achieve power sharing among the units 2.1 to 2.N according to FIG. 2.

In the following it is assumed that short circuits that occur before the electrical bus B1 are handled by local protection of the units by switching them off i.e. short circuit voltage on the terminals of the inverter 3 $V_2$ will be at least the short circuit voltage of the transformer 7, the desired droop control voltage $\tilde{V}_2^d(t)$ is always given by a three phase symmetrical voltage, that can be written by the following equation:

$$\tilde{V}_2^d(t) = \begin{pmatrix} \tilde{v}_{2,1}^d(t) \\ \tilde{v}_{2,2}^d(t) \\ \tilde{v}_{2,3}^d(t) \end{pmatrix} = |\tilde{V}_2^d(t)| \begin{pmatrix} \sin(\delta(t)) \\ \sin(\delta(t) - 2/3\pi) \\ \sin(\delta(t) + 2/3\pi) \end{pmatrix}$$

with $$|\tilde{V}_2^d| = \sqrt{\frac{2}{3}\left((\tilde{v}_{2,1}^d)^2 + (\tilde{v}_{2,2}^d)^2 + (\tilde{v}_{2,3}^d)^2\right)}$$

In the sequel a Clarke transformation for a three phase signal $X(t) \in \mathbb{R}^3$ is used which is defined as:

$$X^{\alpha\beta}(t) = \frac{2}{3}\begin{pmatrix} 1 & -\frac{1}{2} & \frac{1}{2} \\ 0 & \frac{\sqrt{3}}{2} & -\frac{\sqrt{3}}{2} \end{pmatrix} X(t)$$

with $X^{\alpha\beta}(t) \in \mathbb{R}^3$ and $$T = \frac{2}{3}\begin{pmatrix} 1 & -\frac{1}{2} & \frac{1}{2} \\ 0 & \frac{\sqrt{3}}{2} & -\frac{\sqrt{3}}{2} \end{pmatrix}$$

wherein $T \in \mathbb{R}^{2 \times 3}$. The vector $X^{\alpha\beta}(t)$ can be interpreted as a rotating phasor in a fixed Cartesian coordinate system. The length of the phasor $X(t) \in \mathbb{R}^3$ with $X(t)=(x_1(t),x_2(t),x_3(t))^\tau$ is defined as $$|X(t)| = \|TX(t)\|_2$$

$$\Leftrightarrow |X(t)| = \sqrt{\frac{2}{3}(x_1^2(t) + x_2^2(t) + x_3^2(t))}$$

In the following, the separation into amplitude and phase information of the quantities is used for some short circuit strategies. Hence, it is exemplary introduced for the desired droop control voltage $\tilde{V}_2^d$ and the second measured output current $I_2$. Of course, the decomposition can be done in a similar way for other quantities, e.g. for the desired reference voltage $V_2^d$. The separation can be achieved using the above term, to calculate the voltage and current amplitudes $$|\tilde{V}_2^d| = \sqrt{\frac{2}{3}((\tilde{v}_{2,1}^d)^2 + (\tilde{v}_{2,2}^d)^2 + (\tilde{v}_{2,3}^d)^2)}$$

$$|I_2| = \sqrt{\frac{2}{3}(i_{2,1}^2 + i_{2,2}^2 + i_{2,3}^2)}$$

The phase information can be calculated by $\sin(\Phi_{\tilde{V}_2^d}) = \tilde{V}_2^d/|\tilde{V}_2^d|$ and $\sin \Phi_{I_2} = I_2/|I_2|$ wherein $\sin(\Phi_{\tilde{V}_2^d})$, $\sin \Phi_{I_2} \in \mathbb{R}^3$ under the assumption that $|\tilde{V}_2^d| \neq 0$ and $|I_2| \neq 0$. The signals can then be restored using the connection:

$$\tilde{V}_2^d = |\tilde{V}_2^d|(\sin \Phi_{\tilde{V}_2^d})$$

$$I_2 = |I_2|(\sin \Phi_{I_2})$$

Referring to the control structure according to FIG. 4 the short circuit controller has two input signals, namely $\tilde{V}_2^d = (\tilde{v}_{2,1}^d, \tilde{v}_{2,2}^d, \tilde{v}_{2,3}^d)^T$ and $I_2=(i_{2,1}, i_{2,2}, i_{2,3})^T$, and one output signal, namely the desired reference voltage $V_2^d=(v_{2,1}^d, v_{2,2}^d, v_{2,3}^d)^T$. In the sequel different solutions for the functions $V_2^d=f(\tilde{V}_2^d, I_2)$ for limiting the short circuit current by changing the desired reference voltage $V_2^d$ at the input of the voltage controller 8 will be presented. Note, that the presented functions could also be used to limit the voltage amplitude $V_1^d$ as a function of the current $I_2$ or the current $I_1$ as described in connection with FIGS. 9 to 11.

A first solution for limiting the short circuit current is a reduction of the voltage amplitude $|V_2^d|$ of the desired reference voltage $V_2^d$ as a function of the amplitude $|I_2|$ of the output current $I_2$ (the second output current $I_2$ is measured between the low-pass filter 5 and the transformer 7) such that the output voltage $V_2^d$ is:

$$V_2^d(\tilde{V}_2^d, I_2) = (|\tilde{V}_2^d| - f_1(|I_2|))\sin(\Phi_{\tilde{V}_2^d}) \text{ wherein } (|\tilde{V}_2^d| - f_1(|I_2|)) = |V_2^d|$$

The voltage amplitude $|\tilde{V}_2^d|$ is then given by the offset of $|\tilde{V}_2^d|$ and a current dependent function $f_1(|I_2|)$.

Figure 5:
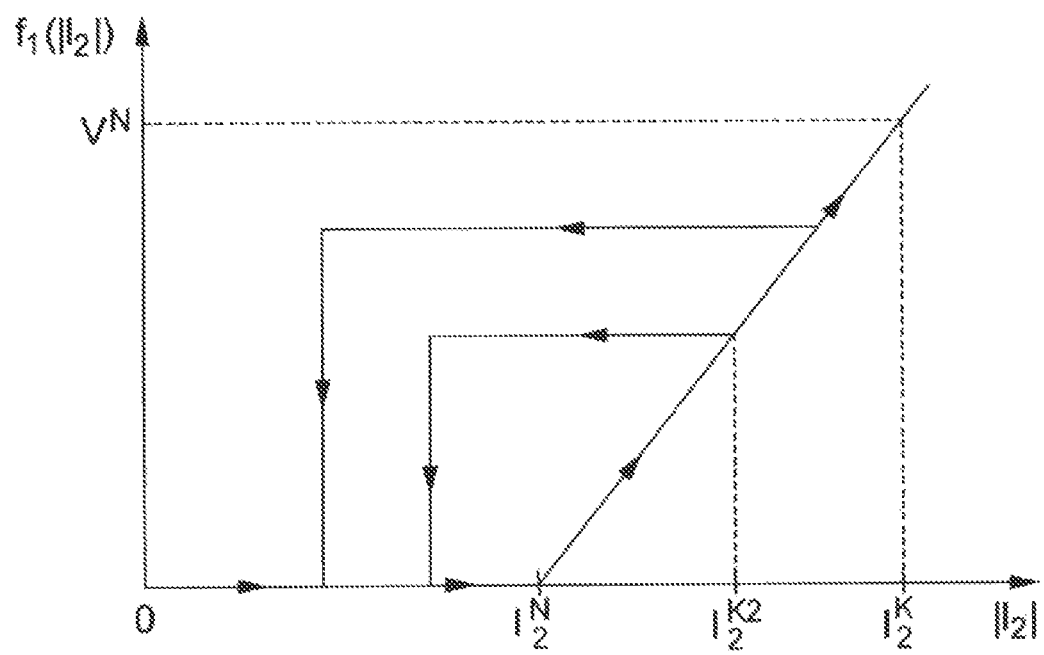
FIG. 5 is a schematic graph of a reduction of a voltage amplitude as function of a current amplitude used to limit a short circuit current of an inverter.

A possible form of the current dependent function $f_1(|I_2|)$ is shown in FIG. 5 of the drawings.

If the amplitude of the measured output current $I_2$ raises above a given limit $|i_2^N|$, the function $f_1(|I_2|)$ becomes greater than zero. In terms of the desired reference voltage $V_2$ according to the above equitation, the voltage amplitude $|V_2^d|$ of the desired reference voltage $V_2^d$ decreases. The arrows in FIG. 5 denote that the function $f_1(|I_2|)$ raises fast and decreases slow, due to a slew/ramp rate for falling values of the measured output current $I_2$. Hence, when the short circuit is cleared, the function $f_1(|I_2|)$ slowly decreases, i.e. the voltage amplitude $|V_2^d|$ of the desired reference voltage $V_2^d$ slowly increases. This is due to reduce inrush currents into the transformer 7 and possible overvoltage.

The solution described before in connection with the control structure according to FIG. 4 is in compliance with the technical requirements of a limitation of current and voltage as well as with a synchronization and load sharing.

As to a limitation of current and voltage the proposed reduction of the voltage amplitude $|V_2^d|$ of the desired reference voltage $V_2^d$, a short circuit can be limited to a desired value. The fact that the output voltage $V_2$ is reduced for all phases in the same way, even in case of an unsymmetrical short circuit, does not limit the ability to deliver the desired short circuit current for the concerned phase(s), since the decrease in the voltage amplitude $|V_2^d|$ of the desired reference voltage $V_2^d$ is a function of the current of the faulty phase(s). Hence, the decrease of voltage of the non-faulty phase(s) has no negative effect on the short circuit behavior. Furthermore, a change of the voltage amplitude during one period in case of unsymmetrical faults can be reduced by adjusting the rising edge slew rate of the function $f_1(|I_2|)$.

Synchronization and short circuit power sharing can be achieved if the voltage amplitude on the so called point of common coupling, where the transformers of the units 2.1 to 2.N are connected is not too small. If the voltage on the point of common coupling is below a certain value in the range of approximately 10% of the nominal value $V^N$, this property cannot be guaranteed. In this case, the inverters cannot synchronize, which leads to an increase or decrease of the phase angle differences between the droop controlled inverters. This change of the phase angle differences has two effects: a) There is an undesired current flow between the inverters and b) the short circuit power decreases as phase angle differences are not constant any more. Still, if the drift is not too high, the phase angles will not increase to a risky value, and the inverters can still synchronize. Simulations showed that for the time of a short circuit, which is typically below approximately five seconds the phase angle drift does not result in problems for the power sharing during and after a short circuit. The slow increase of the voltage amplitude after the short circuit can additionally reduce the load swing between the units as the power flow increases with the voltage amplitude.

Figure 6:
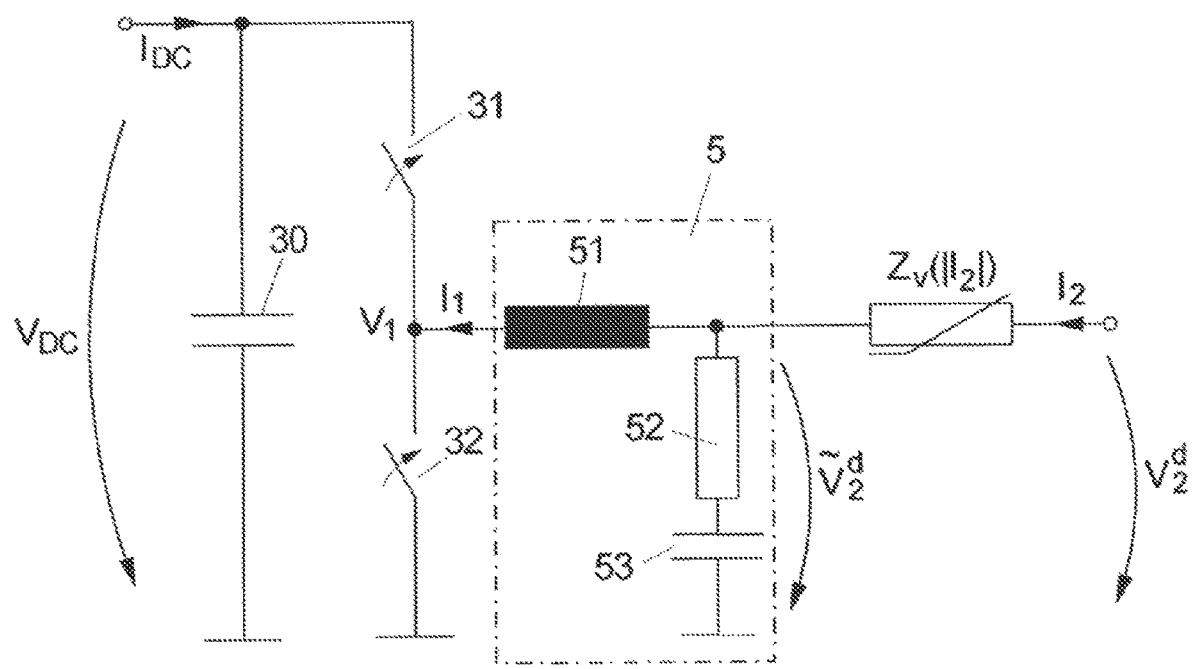
FIG. 6 is a schematic circuit diagram of an inverter with a virtual frequency independent output impedance.

A second solution for limiting the short circuit current is by introducing a virtual output impedance and, herewith take into account the phase information of the current for limitation. Figuratively speaking, the virtual output impedance $Z_v(|I_2|)$ is placed between the low-pass filter 5 and the output terminals of the power electronic devices 4 of the inverter 3, as shown in FIG. 6. The schematic single-line representation of the switching, voltage source inverter 3 with a virtual frequency independent output impedance $Z_v(|I_2|)$ mainly corresponds to the diagram according to FIG. 3 wherein the input terminals of two semiconductor switches 31, 32 of the power electronic device are connected to a DC-source providing a DC input voltage $V_{DC}$ and a DC input current $I_{DC}$ and a DC bus input capacity 30. The output terminals of the semiconductor switches 31, 32 are commonly connected to a first (semiconductor terminal) of a filter inductance 51 of a low-pass filter 5 the second terminal of which is connected to a series connection of a filter resistor 52 and a filter capacitor 53 connected to ground as well as to the virtual frequency independent output impedance $Z_v(|I_2|)$.

A first output voltage $V_1$ and a first measured output current $I_1$ are delivered at the interconnection of the output terminals of the semiconductor switches 31, 32 of the power electronic device. A desired droop control voltage $\tilde{V}_2^d$ from the next control cascade is provided at the series connection of the filter resistor 52 and filter capacitor 53 of the low-pass filter 5 and a second output current $I_2$ (in case of a short circuit, the short circuit current) is provided on the line between the virtual frequency independent output impedance $Z_v(|I_2|)$ and the output terminal of the inverter 3 with the output voltage $V_2$ of the inverter 3.

The virtual output impedance $Z_v(|I_2|)$ could also be placed in series with the filter inductance 51 of the low-pass filter 5, resulting in a very similar behavior. The impedance is virtual in the sense that it is part of a control software, with the advantage that it has more degrees of freedom in the design than a real passive component. For a different control structure the virtual output impedance $Z_v(|I_2|)$ can be placed in another part of the inverter 3 or electrical network and not as shown in FIG. 6.

The virtual output impedance $Z_v(|I_2|)$ is preferably designed as a frequency independent impedance, but the reactance could be extended to a real frequency dependent impedance with its own state. The impedance is assumed to be a resistor, but could be extended to any impedance (ohmic/inductive/capacitive or mixed). In compliance with the circuit in FIG. 6, the output of the inverter with short circuit handling is:

$$V_2^d = \tilde{V}_2^d + Z_v(|I_2|)I_2$$

where the term $Z_v(|I_2|)$ represents a current dependent virtual output impedance. In the sequel, two impedance models will be presented as examples for the functional principle of the solution.

Figure 7:
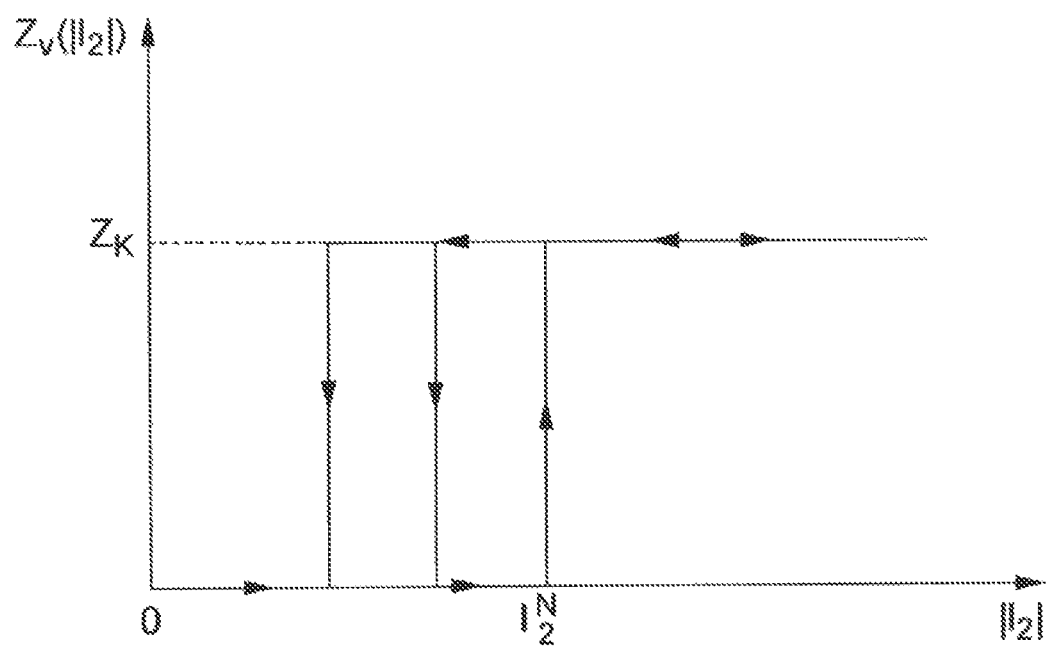
FIG. 7 is a schematic graph of a virtual, piecewise constant frequency independent impedance as function of a current used to limit a short circuit current of an inverter.

In a first impedance model, a virtual, piecewise constant impedance $Z_v(|I_2|) = f(|I_2|)$ as a function of the output current amplitude $|I_2|$ is used to limit the short circuit current of the inverter. FIG. 7 illustrates a schematic graph of such a virtual, piecewise constant impedance $Z_v$ as function of the current $|I_2|$, defining the impedance as $$Z_v(|I_2|) = \begin{cases} Z_K & \text{if } |I_2| \geq I_2^N \\ 0 & \text{else} \end{cases}$$

Hence, the virtual, piecewise constant impedance $Z_v(|I_2|)$ is zero as long as the output current amplitude $|I_2|$ is below a certain threshold, for example a nominal current $I_2^N$. If the current $|I_2|$ exceeds this value, the impedance $Z_v$ is switched to a constant value $Z_K$. If the short circuit clears, the impedance $Z_v$ can be decreased in two ways: Instantaneously or with a slew or ramp rate.

If the virtual impedance $Z_v$ is decreased with a slew rate, the voltage $V_2^d$ increases for as the impedance $Z_v$ becomes smaller. In case the impedance $Z_v$ is set to zero instantaneously, there needs to be a function that ensures that the impedance value is not changed all the time in case of an unsymmetrical short circuit. Therefore, a function is used that changes the value of $Z_v$ only if the current $|I_2|$ is below the threshold or nominal current $I_2^N$ for a certain time period. This is done to evite switching the impedance $Z_v$ on and off during an unsymmetrical short circuit, as that could excite the dynamical system, and hence lead to overvoltages or overcurrents. Combining the last two equations the desired reference voltage $V_2^d$ can easily be calculated as $$V_2^d = \begin{cases} \tilde{V}_2^d + Z_K I_2 & \text{if } |I_2| \geq I_2^N \\ \tilde{V}_2^d & \text{else} \end{cases}$$

where the output current $I_2$ is oriented according to FIG. 6, i.e. from the output terminal of the inverter to the virtual impedance $Z_v$.

A limitation of the short circuit current of the inverter by means of a virtual, piecewise constant impedance $Z_v(|I_2|) = f(|I_2|)$ as a function of the output current amplitude $|I_2^N|$ is in compliance with the technical requirements of a limitation of current and voltage as well as with synchronization and load sharing.

As to a limitation of current and voltage the proposed reduction of the voltage amplitude $|V_2^d|$ of the desired reference voltage $V_2^d$, a short circuit can be limited to a desired amount. Since only the faulty phase(s) have an increased current and therefore a voltage drop over the virtual impedance $Z_v$, unsymmetrical short circuits result in a voltage imbalance. Still, this is not a problem, as the desired short circuit currents are delivered. (a voltage imbalance occurs all the time during short circuit of conventional generators not leading to problems in this case).

Synchronization and short circuit power sharing can be achieved if the voltage amplitude on the point of common coupling, where the transformers of the units are connected is not too small. If the voltage on the point of common coupling is below a certain value in the range of approximately 10% of the nominal value $V^N$, this property cannot be guaranteed. However, if the voltage is above this value, the proposed strategy leads to power sharing during short circuits. If the voltage at the point of common coupling is below about 10% of the nominal value $V^N$, the drift cannot be influenced by the decentralized synchronization, but is in a range, where the short circuit currents can still be served.

Figure 8:
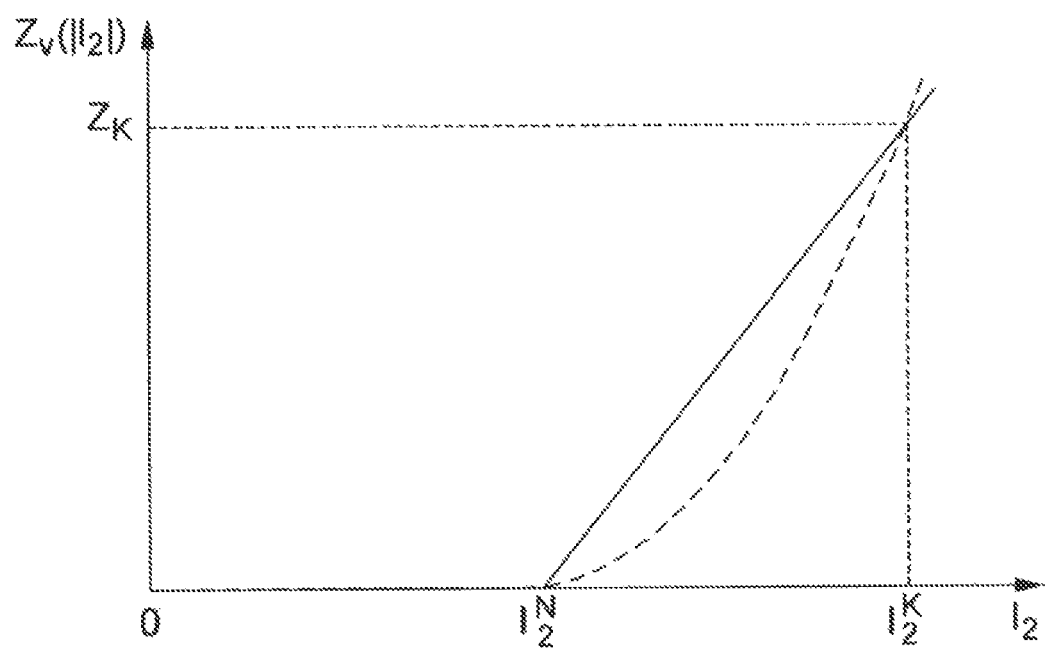
FIG. 8 is a schematic graph of a virtual, piecewise affine (solid line) and polynomial (dashed line) impedance as function of a current used to limit a short circuit current of an inverter.

In a second impedance model a current dependent impedance is used to limit the short circuit currents instead of a virtual, piecewise constant impedance $Z_v$. The current dependent impedance $Z_v(|I_2|)$ could have a piecewise affine or polynomial gradient, as depicted in FIG. 8. In case of a piecewise affine function, the virtual impedance $Z_v$ changes according to the output current $I_2$, such that:

$$Z_v(|I_2|) = \begin{cases} \frac{V^N}{I_2^K - I_2^N}(|I_2| - I_2^N) & \text{if } |I_2| \geq I_2^N \\ 0 & \text{else} \end{cases}$$

Hence, the virtual impedance $Z_v(|I_2|)$ changes all the time with the short circuit current amplitude $|I_2|$. Instead of a linear function (solid line) as depicted in FIG. 8 the virtual impedance $Z_v(|I_2|)$ can follow a polynomial (dashed line), exponential, sinusoidal, spline, exponential, etc. form.

Furthermore, the change of the value of the virtual impedance $Z_v(|I_2|)$ can be limited in order to obtain a more sinusoidal waveform during unsymmetrical short circuits. As stated before, this slew rate must not limit the rising, but only the falling edge of the virtual impedance $Z_v(|I_2|)$, as a limitation of the rising edge might lead to overcurrents if the voltage is not reduced enough if overcurrents occur.

A limitation of the short circuit current of the inverter by means of a virtual, current dependent impedance $Z_v(|I_2|) = f(|I_2|)$ as a function of the output or short circuit current amplitude $|I_2^N|$ is in compliance with the technical requirements of both a limitation of a short circuit current and voltage and with synchronization and power sharing.

With the proposed reduction of the voltage amplitude, the short circuit can be limited to a desired amount. As only the faulty phase(s) have an increased current and therefore a voltage drop over the virtual current dependent impedance $Z_v(|I_2|)$, unsymmetrical short circuits lead to an additional voltage imbalance as $Z_v(|I_2|)=f(|I_2|)$ changes all the time with the current amplitude. This phenomenon can be reduced by adjusting the falling edge slew rate of $Z_v(|I_2|)=f(|I_2|)$. However, the short circuit currents can reliably be served.

As with a limitation of the short circuit current of the inverter by means of a virtual current dependent impedance $Z_v(|I_2|)=f(|I_2|)$ synchronization can be achieved if the voltage amplitude on the point of common coupling, where the transformers of the units are connected is not too small.

Figure 9:
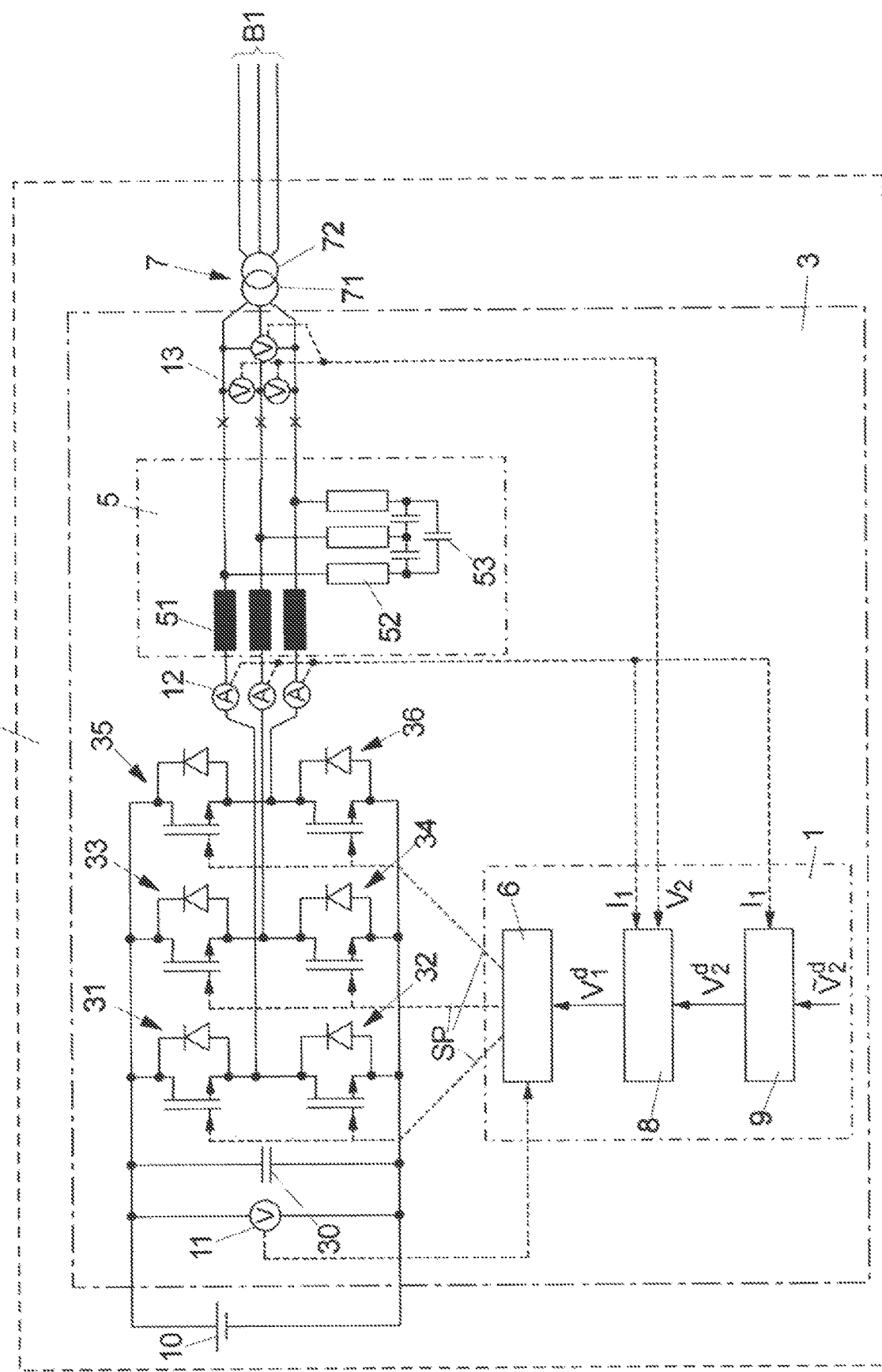
FIG. 9 is a schematic circuit and block diagram of a second embodiment of a control structure of a grid forming unit wherein the output voltage of an inverter is controlled as a function of the current of the lines between the output terminals of the power electronic devices and the low-pass filter of the inverter and a desired droop control voltage.
Figure 10:
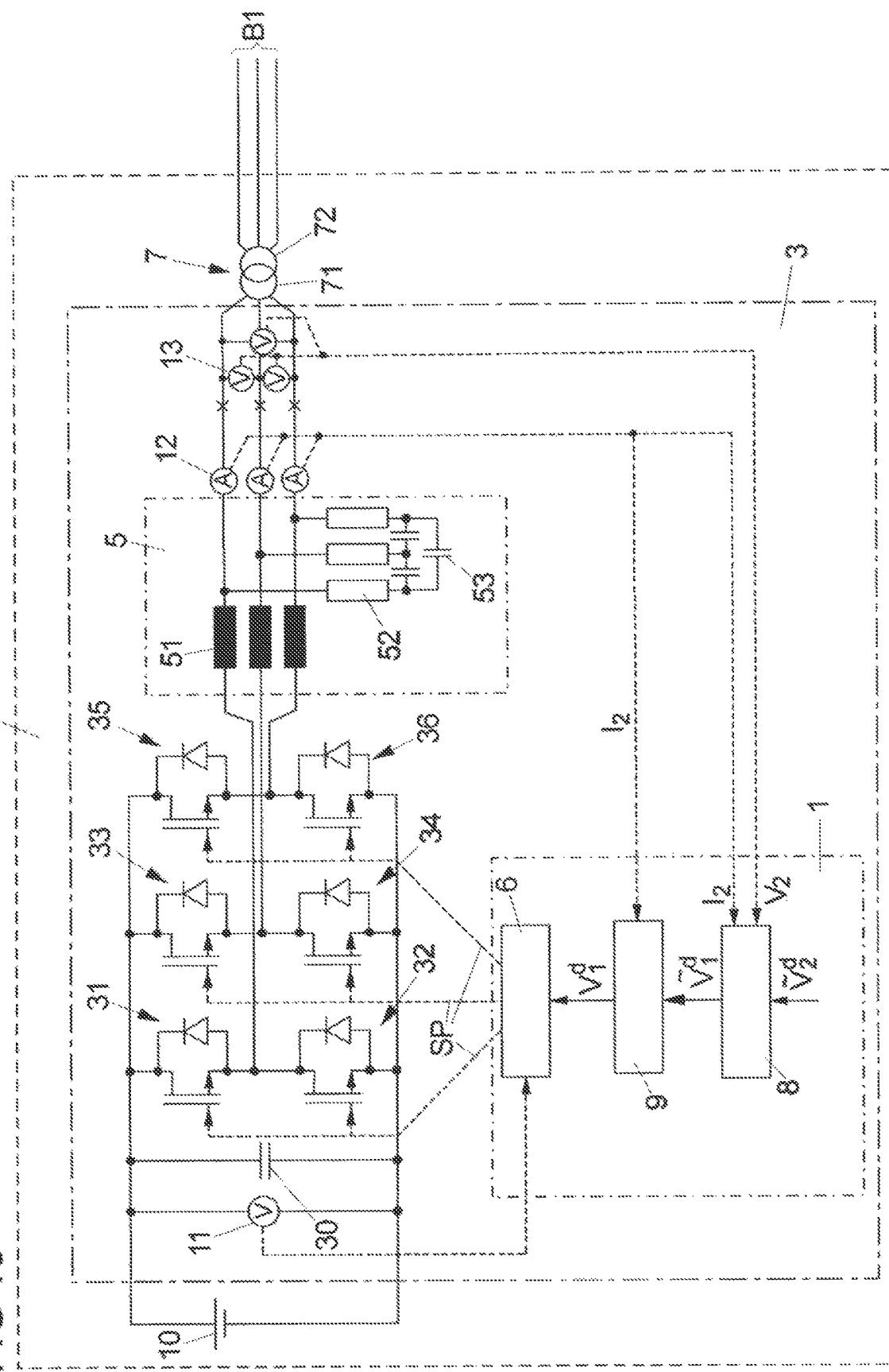

The solutions to comply with the technical requirements both of a limitation of short circuit current and voltage as well as with a synchronization and load sharing described before in connection with the control structure according to FIG. 4 are likewise adoptable to the control structures of FIGS. 9 to 11.

FIG. 9 depicts a schematic circuit and block diagram of a second embodiment of a discrete time controller 1 for a grid forming unit 2 for handling normal operation as well as a short circuit on the electrical network or transmission line. The discrete time controller 1 comprises a pulse width modulator 6, a voltage controller 8 and a short circuit controller 9. In contrast to the control structure according to FIG. 4 the mean output voltage $V_2$ is not controlled as a function of the second measured output current $I_2$ on the lines between the low-pass filter 5 of the grid forming inverter 3 and the transformer 7 but as a function of the first measured output current $I_1$ on the lines between the output terminals of the power electronic devices 4 and the low-pass filter 5 of the inverter 3 and the desired droop control voltage $\tilde{V}_2^d$ from the next control cascade.

In accordance with the cascaded control structure of FIG. 4 the inner loop consists of the voltage controller 8 and the unit 2 which comprises a DC-source 10, an inverter 3, a transformer 7 and a pulse width modulator 6. The primary winding 71 of the transformer 7 is connected to a low-pass filter 5 and the secondary winding 72 of the transformer 7 is connected to the bus bar B1 of the network or grid which may also contain inverters and conventional generators with a similar control structure as the controlled inverter 3. The inverter 3 includes controllable power electronic devices 31-36, the low pass filter 5 and the pulse width modulator 6 which provides switching pulses SP to the control terminals of the power electronic devices 31-36 depending on the measured input voltage $V_{DC}$ of the DC-source 10 and the desired mean value over one switching period of the input voltage $V_1^d \in \mathbb{R}^3$ on the power electronic side of the low-pass filter 5 provided by the output terminal of the voltage controller 8 which is used to control the output voltage $V_2$ according to the desired reference voltage $V_2^d$.

The input terminals of the voltage controller 8 receive a first input signal corresponding to the output voltage $V_2$ of the inverter 3 at the beginning of the calculations of the discrete time controller, a second input signal corresponding to the measured output current $I_1 \in \mathbb{R}^3$ on the lines between the output terminals of the power electronic devices 31-36 and the low-pass filter 5 of the grid forming inverter 3.

The short circuit controller 9 is added to the inner loop for changing the reference voltage amplitude $V_2^d \in \mathbb{R}^3$ of the inverter terminals. The short circuit controller 9 receives at its input terminals an input signal corresponding to the measured output current $I_1$ on the lines between the output terminals of the power electronic devices 31-36 and the low-pass filter 5 of the grid forming inverter 3 and a desired droop control voltage $\tilde{V}_2^d$ from the next control cascade. At its output terminal the short circuit controller provides a reference voltage $V_2^d$ to an input terminal of the voltage controller 8.

In order to limit the short circuit current, the output voltage $V_2$ on the terminals of the inverter 3 is reduced as a function of the first measured output current $I_1$ on the lines between the output terminals of the power electronic devices 31-36 and the low-pass filter 5 of the inverter 3. Through the voltage controller 8 the desired voltage $V_2^d=f(\tilde{V}_2^d, I_1)$ is controlled, using the measured values for the voltage $V_2$ and the current $I_1$, such that $V_1^d$ is changed and transformed to switching pulses SP from the pulse width modulator 6 for the power electronic devices 31-36.

The desired droop control voltage $\tilde{V}_2^d$ is generated using droop control as described above to synchronize the inverters and achieve power sharing among the units 2.1 to 2.N according to FIG. 2.

FIG. 10 depicts a schematic circuit and block diagram of a third embodiment of a control structure of the discrete time controller 1 of the grid forming unit 2 for handling normal operation as well as a short circuit on the electrical network or transmission line. The discrete time controller 1 comprises a pulse width modulator 6, a voltage controller 8 and a short circuit controller 9. The input voltage of the inverter 3 is controlled as a function of the second measured output current $I_2$ on the lines between the low-pass filter 5 of the inverter 3 and a transformer 7, an output voltage $V_2$ of the inverter 3 and a desired droop control voltage $\tilde{V}_2^d$ from the next control cascade.

The unit 2 comprises a DC-source 10, the inverter 3, the transformer 7 and a pulse width modulator 6. The primary winding 71 of the transformer 7 is connected to the low-pass filter 5 through a closed switch and the secondary winding 72 of the transformer 7 is connected to the electrical transmission line $TL_1$ of the network or grid which may also contain inverters and conventional generators with a similar control structure as the controlled inverter 3. The inverter 3 includes controllable power electronic devices 31-36 and the low pass filter 5.

As with the control structure of FIGS. 4 and 9 the switching pulses SP provided by the pulse width modulator 6 to the control terminals of the power electronic devices 4 depend on the measured input voltage $V_{DC}$ of the DC-source and a desired input voltage $V_1^d \in \mathbb{R}^3$ on the power electronic side of the low-pass filter 5. However, unlike the cascaded control structures of FIGS. 4 and 9 the desired input voltage $V_1^d \in \mathbb{R}^3$ a is not provided by the output terminal of the voltage controller 8 but by an output of the short circuit controller 9 the input terminals of which receive both a first input signal corresponding to the second measured output current $I_2$ on the lines between the low-pass filter 5 of the inverter 3 and the transformer 7 and a first reference input voltage $\tilde{V}_1^d$ provided by the output of the voltage controller 8.

The input terminals of the voltage controller 8 receive both a first input signal corresponding to the output voltage $V_2$ of the inverter 3, a second input signal corresponding to the second measured output current $I_2 \in \mathbb{R}^3$ on the lines between the low-pass filter 5 of the inverter 3 and the transformer 7 and a third input signal corresponding to the desired droop control voltage $\tilde{V}_2^d$ from the next control cascade.

Thus, in order to limit the short circuit current, the input voltage $V_1$ on the power electronic elements 31-36 side of the filter 5 is reduced as a function of the second measured output current $I_2 \in \mathbb{R}^3$ and the desired droop control voltage $\tilde{V}_2^d$ generated using droop control as described above to synchronize the inverters 3.1 to 3.N and achieve power sharing among the units 2.1 to 2.N.

FIG. 11 is a schematic circuit and block diagram of a fourth embodiment of the control structure of the grid forming unit 2 which mainly corresponds to the control structure according to FIG. 10. The discrete time controller 1 for handling normal operation as well as a short circuit on the electrical network or transmission line comprises a pulse width modulator 6, a voltage controller 8 and a short circuit controller 9.

In accordance with the cascaded control structures of FIGS. 4, 9 and 10 the inner loop consists of the voltage controller 8 and the unit 2 which comprises a DC-source 10, an inverter 3, a transformer 7 and the pulse width modulator 6. The primary winding 71 of the transformer 7 is connected by a switch to the low-pass filter 5 and the secondary winding 72 of the transformer 7 is connected to the electrical bus B1 of the network or grid which may also contain inverters and synchronous generators with a similar control structure as the controlled inverter 3. The inverter 3 includes controllable power electronic devices 31-36 and the low pass filter 5. The pulse width modulator 6 provides switching pulses SP to the control terminals of the power electronic devices 4 depending on the measured input voltage $V_{DC}$ of the DC-source and the desired input voltage $V_1^d \in \mathbb{R}^3$ on the power electronic elements 31-36 side of the low-pass filter 5.

As with the control structure of FIG. 10 the desired input voltage $V_1^d \in \mathbb{R}^3$ is not provided by the output terminal of the voltage controller 8 but by an output of the short circuit controller 9 the input terminals of which receive both a first input signal corresponding to the first measured output current $I_1 \in \mathbb{R}^3$ on the lines between the output terminals of the power electronic devices 31-36 and the low-pass filter 5 of the inverter 3 and a first reference input voltage $\hat{V}_1^d$ provided by the output of the voltage controller 8.

The input terminals of the voltage controller 8 receive both a first input signal corresponding to the output voltage $V_2$ of the inverter 3, a second input signal corresponding to the first measured output current $I_1 \in \mathbb{R}^3$ on the lines between the output terminals of the power electronic devices 31-36 and the low-pass filter 5 of the inverter 3 and a third input signal corresponding to the desired droop control voltage $\tilde{V}_2^d$ from the next control cascade.

In order to limit the short circuit current, the output voltage $V_1$ on the power electronic side of the low-pass filter 5 is reduced as a function of the first measured output current $I_1 \in \mathbb{R}^3$ and the desired droop control voltage $\tilde{V}_2^d$ generated using droop control as described above to synchronize the inverters 3.1 to 3.N according to FIG. 2 and achieve power sharing among the units 2.1 to 2.N.

REFERENCE SIGNS

| | |
|---|---|
| 1 | (discrete) time controller |
| 2; 2.1-2.N | (inverter) units |
| 3; 3.1-3.N | (grid forming, droop controlled) inverters |
| 4.1-4.N | conventional generator units |
| 5 | low-pass filter |
| 6 | (pulse width) modulator |
| 7; 7.1-7.N | transformers |
| 8 | voltage controller |

REFERENCE SIGNS -continued

| | |
|---|---|
| 9 | short circuit controller |
| 10; 10.1-10.N | DC-source (storage units) |
| 11 | DC voltage sensor |
| 12 | current sensor |
| 13 | second voltage sensor |
| 14, 15 | protection switches |
| 17 | summing element |
| 30 | DC input capacitor |
| 31-36 | semiconductor switches |
| 40.1-40.N | conventional generation units |
| 41.1-41.N | Transformers of the corresponding conventional generation units |
| 53 | filter capacitor |
| 51 | filter inductance |
| 52 | filter resistor |
| 71 | primary winding of the transformer |
| 72 | secondary winding of the transformer |
| $B_1$-$B_N$ | bus bar |
| $I_1$ | first measured current |
| $|I_1|$ | first short circuit current amplitude |
| $I_{DC}$ | Current from DC source |
| $I_2$ | second measured current |
| $|I_2|$ | Second measured current amplitude |
| $I_2^N$ | Threshold current, where the short circuit handling starts |
| $I_2^K$ | Short circuit current |
| $I_2^{K1}$ | Maximum short circuit current |
| $L_1$-$L_N$ | loads |
| $PV_1$-$PV_N$ | photovoltaic (solar) power units |
| SC | Short circuit |
| SP | Switching pulses |
| $TL_1$-$TL_N$ | transmission lines |
| $V_1$ | first output voltage |
| $V_1^d$ | Desired mean voltage over one switching period |
| $\hat{V}_1^d$ | Desired voltage on power electronic terminals before short circuit handling |
| $V_2$ | second measured voltage |
| $V_2^d$ | desired reference voltage |
| $\tilde{V}_2^d$ | desired droop control voltage |
| $\Delta V_2^d$ | second reference input voltage |
| $V_{DC}$ | DC capacitor voltage |
| $V^N$ | Nominal voltage |
| $WP_1$-$WP_N$ | wind power units |
| $Z_k$ | Short circuit impedance |
| $Z_v$ | virtual impedance |

What is claimed is:

1. A system for handling short circuits on an electrical network comprising:

parallel operated units which are droop controlled for active and reactive power sharing and connected to each other via impedances and protection switches for detecting a short circuit on the electrical network and for disconnecting a faulty part of the electrical network, said parallel operated units including a direct current source and a grid forming voltage source inverter coupled to a cascaded control structure with a voltage controller and a short circuit controller for limiting output current and output voltage at output terminals of the grid forming voltage source inverter as a function of a measured output current and a desired droop voltage from a droop control for voltage and frequency power sharing, wherein the parallel operated unit are configured to provide a desired reference voltage of a short circuit handled inverter to an inner voltage control loop, wherein the parallel operated units are configured to reduce a voltage amplitude of the desired reference voltage as a function of the desired droop voltage of the droop control and an output current amplitude, such that the desired reference voltage is given by an offset of the desired droop voltage and a function dependent on the output current according to the following equations:

$V_2^d(\tilde{V}_2^d, I_2) = (|\tilde{V}_2^d| - f_1(|I_2|))\sin(\Phi_{\tilde{V}_2^d})$ $(|\tilde{V}_2^d| - f_1(|I_2|)) = V_2^d|)$ $\sin(\Phi_{\tilde{V}_2^d}) = \tilde{V}_2^d / |\tilde{V}_2^d|$ and $\sin(\Phi_{\tilde{V}_2^d}) \in \mathbb{R}^3$ for $|\tilde{V}_2^d| \neq 0$ wherein $V_2^d$ is the desired reference voltage, $|V_2^d|$ is the voltage amplitude of the desired reference voltage, $\tilde{V}_2^d$ is the desired droop voltage, $|I_2|$ is the output current amplitude, and $|\tilde{V}_2^d|$ is the offset of the desired droop voltage.

2. The system of claim 1, wherein the function dependent on the output current is zero if an amplitude of a second measured output current is lower than a given current limit and greater than zero if the amplitude of the second measured output current rises above the given current limit.

3. The system of claim 2, wherein the function dependent on the output current rises responsive to the amplitude of the second measured output current rising above the given current limit and decreases more slowly due to a slew rate for falling values of a current amplitude of the second measured output.

4. The system of claim 1, wherein a virtual impedance is disposed between a low-pass filter of the grid forming voltage source inverter and the output terminals of the grid forming voltage source inverter such that the desired reference voltage depends on the desired droop voltage and a second measured output current, and wherein the virtual impedance is frequency independent and output current dependent, wherein the virtual impedance is defined according to $V_2^d = \tilde{V}_2^d + Z_v(|I_2|)I_2$, wherein $Z_v(|I_2|)$ is the virtual impedance and $I_2$ is the second measured output current.

5. The system of claim 4, wherein the virtual impedance is a piecewise constant impedance which, according to $$Z_v(|I_2|) = \begin{cases} Z_K & \text{if } |I_2| \geq I_2^N \\ 0 & \text{else} \end{cases}$$

is zero as long as the second measured output current is below a given threshold value, in particular a nominal second output current, and which is switched to a constant value if the second measured output current exceeds the given threshold value, wherein $|I_2^N|$ is the given threshold value and $I_2^N$ is the nominal second output current.

6. The system of claim 5, wherein the parallel operated units are configured to, after clearing the short circuit, decrease the virtual impedance with a slew rate such that a second output voltage of the grid forming voltage source inverter increases as the virtual impedance becomes smaller.

7. The system of claim 5, wherein the parallel operated units are configured to, after clearing the short circuit, set the virtual impedance to zero and to activate a function so that a value of the virtual impedance is changed only if the second measured output current is below a certain threshold for a respective period.

8. The system of claim 4, wherein the virtual impedance is a current dependent impedance with a piecewise affine, polynomial, exponential, spline, or a sinusoidal function.

9. The system of claim 8, wherein the virtual impedance is defined by a piecewise affine function that changes with an amplitude of the second measured output current ($I_2$) according to $$Z_v(|I_2|) = \begin{cases} \dfrac{V^N}{I_2^K - I_2^N}(|I_2| - I_2^N) & \text{if } |I_2| \geq I_2^N \\ 0 & \text{else} \end{cases}$$

wherein $V^N$ is a nominal output voltage of the grid forming voltage source inverter, $I_2^N$ is a current threshold of the grid forming voltage source inverter, $|I_2|$ is the amplitude of the second measured output current of the grid forming voltage source inverter and $I_2^K$ is the short circuit current to be provided of the second measured output current of the grid forming voltage source inverter.

10. The system of claim 9, wherein changing a value of the virtual impedance is limited to obtain a more sinusoidal waveform during nonsymmetrical short circuits.

11. The system of claim 8, wherein the virtual impedance follows a polynomial, exponential, spline, or sinusoidal function.

12. The system of claim 1, wherein a first unit including the grid forming voltage source inverter comprises power electronic devices having an input terminal, an output terminal and a control terminal, a low pass filter connected to the output terminal of the power electronic devices and a time controller, wherein the control terminals of the power electronic devices are configure to receive switching pulses from an output of the time controller, the input terminals of which are exposed to a measured input voltage of the direct current source, an output voltage of the grid forming voltage source inverter, a measured output current of the power electronic devices, or a measured output current of the grid forming voltage source inverter, and a desired droop control voltage from a next control cascade, wherein the time controller comprises a pulse width modulator configured to provide the switching pulses to the control terminals of the power electronic devices, the voltage controller, and the short circuit controller.

13. The system of claim 12, wherein the low pass filter of the grid forming voltage source inverter is connected to an impedance or primary winding of a transformer, wherein the transformer includes a secondary winding connected to the electrical network.

14. The system of claim 13, wherein the low pass filter comprises filter inductances between the output terminal of the power electronic devices and the primary winding of the transformer and a series connection of filter resistances and filter capacitors in an interconnection between the filter inductances.

15. The system of claim 12, wherein the voltage controller is configured to receive a first input signal corresponding to the output voltage of the grid forming voltage source inverter, a second input signal corresponding to a second measured output current in an interconnection of filter inductances of the low pass filter and a primary winding of a transformer and a desired output voltage provided by the output of the short circuit controller, wherein the voltage controller is configured to provide a desired input voltage to an input of the pulse width modulator, and wherein the short circuit controller is configured to receive a third input signal corresponding to the second measured output current on the interconnection of the filter inductances of the low pass filter and the primary winding of the transformer and a fourth input signal corresponding to the desired droop voltage from the next control cascade.

16. The system of claim 12, wherein the voltage controller is configured to receive a first input signal corresponding to the output voltage of the grid forming voltage source inverter, a second input signal corresponding to a first measured output current in an interconnection of the output terminal of the power electronic devices and filter inductances of the low pass filter and the desired reference voltage, wherein the voltage controller is configured to provide a desired input voltage to an input of the pulse width modulator, and wherein the short circuit controller is configured to receive a third input signal corresponding to the first measured output current in the interconnection of the output terminal of the power electronic devices and the filter inductances of the low pass filter and a fourth input signal corresponding to the desired droop control voltage from the next control cascade.

17. The system of claim 12, wherein the voltage controller is configured to receive a first input signal corresponding to the output voltage of the grid forming voltage source inverter, a second input signal corresponding to a second measured output current in an interconnection of filter inductances of the low pass filter and a primary winding of a transformer and the desired droop control voltage from the next control cascade, wherein the short circuit controller is configured to receive a third input signal corresponding to the second measured output current in the interconnection of the filter inductances of the low pass filter and the primary winding of the transformer and a first reference input voltage provided at the output of the voltage controller and wherein the short circuit controller is configured to provide a desired input voltage to an input of the pulse width modulator.

18. The system of claim 12, wherein the voltage controller is configured to receive a first input signal corresponding to the output voltage of the grid forming voltage source inverter, a second input signal corresponding to a first measured output current in an interconnection of the output terminal of the power electronic devices and filter inductances of the low pass filter and the desired droop control voltage from the next control cascade, wherein the short circuit controller is configured to receive a third input signal corresponding to the first measured output current in the interconnection of the output terminal of the power electronic devices and the filter inductances of the low pass filter and a first reference input voltage provided at the output of the voltage controller and wherein the short circuit controller is configured to provide a desired input voltage to an input of the pulse width modulator.

19. The system of claim 1, wherein a desired droop control voltage is generated using droop control for synchronizing the grid forming voltage source inverter connected to the electrical network and to achieve short circuit power sharing among the grid forming voltage source inverter and one or more conventional generators connected to the electrical network.

\* \* \* \* \*